United States Patent [19]

Hooykaas

[11] 4,198,450

[45] Apr. 15, 1980

[54] COATING PIPES AND RECEPTACLES WITH A WEIGHTING LAYER OR MASS OF STEEL SLAG AGGREGATE

[75] Inventor: Carel W. J. Hooykaas, Rotterdam, Netherlands

[73] Assignee: Pelt & Hooykaas B.V., Netherlands

[21] Appl. No.: 882,988

[22] Filed: Mar. 3, 1978

Related U.S. Application Data

[60] Continuation of Ser. No. 734,641, Oct. 21, 1976, abandoned, which is a division of Ser. No. 555,264, Mar. 4, 1975, abandoned.

[30] Foreign Application Priority Data

Mar. 6, 1974 [NL] Netherlands .......................... 7403055

[51] Int. Cl.$^2$ ................................................ B05D 1/02
[52] U.S. Cl. .................................... 427/427; 138/145; 427/421; 428/35; 428/36
[58] Field of Search ................... 427/427, 421; 428/35, 428/36; 138/103, 145; 106/97, 117; 61/113

[56] References Cited

U.S. PATENT DOCUMENTS

| | | | |
|---|---|---|---|
| 900,939 | 10/1908 | Kuhl ........................................ 106/117 |
| 1,004,380 | 9/1911 | Daher ............................... 106/117 X |
| 1,033,984 | 7/1912 | Brown ................................... 106/117 |
| 1,627,237 | 5/1927 | Harding ........................... 106/117 X |
| 1,823,928 | 9/1931 | Bjorkman ........................ 106/117 X |
| 2,458,039 | 1/1949 | Wait ................................... 106/117 X |
| 2,518,981 | 8/1950 | Edwards ............................ 61/113 X |
| 2,597,370 | 5/1952 | Peckman ....................... 106/117 UX |
| 2,632,711 | 3/1953 | Trief ....................................... 106/117 |
| 3,240,512 | 3/1966 | Pennington et al. ............. 138/175 X |
| 3,254,380 | 6/1966 | Belcher ............................... 106/117 X |
| 3,488,203 | 1/1970 | Andersson ............................ 106/117 |
| 3,674,546 | 7/1972 | Harris et al. ...................... 427/425 X |
| 3,717,490 | 2/1973 | Hauser ................................... 106/117 |
| 3,861,158 | 1/1975 | Swain et al. ............................ 61/113 |
| 3,920,466 | 11/1975 | Danjusheusky et al. ............. 106/117 |

FOREIGN PATENT DOCUMENTS 1031664   6/1966   United Kingdom ..................... 106/117

*Primary Examiner*—Shrive P. Beck
*Attorney, Agent, or Firm*—Wilkinson, Mawhinney & Theibault

[57] ABSTRACT

The present disclosure is directed to a method of weighting gaseous or fluid transmission pipes and storage containers for under water use to maintain them at the greatest possible depth by applying a weighting layer or mass onto the pipe or container by mixing a finely divided steel slag aggregate having hydraulic binding properties with water to obtain a sprayable mixture and spraying the mixture onto the pipe or container to obtain a weighting coating layer thereon which has hydraulic binding properties.

1 Claim, No Drawings

COATING PIPES AND RECEPTACLES WITH A WEIGHTING LAYER OR MASS OF STEEL SLAG AGGREGATE

This is a continuation of application Ser. No. 734,641, filed Oct. 21, 1976, now abandoned which was a divisional application of Ser. No. 555,264, filed Mar. 4, 1975 (now abandoned).

BACKGROUND

The invention relates to an object for the conveying or storing media, particularly gaseous and liquid media, like oil and gas, which is provided with a hydraulically bound weighting layer or mass with at least one aggregate with a high specific gravity.

Such objects, like pipes for the transmission of media or containers for the storage of media, particularly gaseous and liquid media, which are provided with a weighting shell are known per se. This type of pipe is for example used when conveying oil and gas under water, whereby the used pipes should have a sufficiently high specific gravity to prevent floating or rising to an undesired height.

Particularly when such pipes are installed in the open sea with active shipping traffic, it is advisable to keep these pipes at the greatest possible depth, so as to avoid the risk of damage to pipe lines constructed from them. Also containers used at sea are preferably weighted to permit them being more easily fixed. This means that heavy aggregates should be incorporated into the weighting layer or mass.

A weighting sleeve so far used consists of a mixture of concrete as a hydraulic binding agent and aggregates in the shape of gravel and/or iron ore particles. It is, however, not advisable to use iron ore, since then substances which are valuable in itself are exclusively used for weighting purposes.

On the other hand when gravel is used as aggregate particles, one is compelled to sift out the fine particles and to use exclusively the coarse ones since the finer particles require rather much hydraulic binding agent in order to obtain a coherent mass and small particles make too small a contribution to the desired weightening.

The invention in one aspect aims to provide an article, particularly a pipe or container of the aforementioned type which does not suffer from this disadvantage and which carries a weighting layer or mass of a particularly high specific weight, while moreover it suffices to use a smaller quantity of concrete as a hydraulic binder than with the known weighting sleeves. It is even possible to use no concrete at all, but this requires either a long time to harden the material or an increased temperature.

This object is achieved in that the weighting layer or mass consists of a slag aggregate from metal melting furnaces preferably with hydraulic binding.

Preferably a steel slag aggregate with a hydraulic binding is used.

On account of the hydraulic binding effect of the slag aggregate from a metal melting furnace, which has a particularly high specific gravity, it is possible to obtain a very firm weighting layer or mass with a particularly small quantity of binder, or even with no binding agent at all, this mass having a very high weight, as a much larger quantity of aggregate particles can be incorporated thereinto than in the known shells. A thinner layer with the same weight can therefore be applied to an object, an operation which is desirable in practice.

The invention in another aspect relates to a method for applying a weighting layer or mass to an object, particularly a covering layer for the conveying media, or a container for storing fluids, particularly gaseous or liquid fluids, while the object is provided with a high specific weight containing a hydraulic binding mixture, characterised in that the binding mixture contains a slag aggregate with a hydraulic binding from metal melting furnaces being preferably a steel slag aggregate.

Examples

The invention is hereinafter clarified with reference to some embodiments.

I. Coating a container.

A mixture of 100 kg of steel slag aggregate with a particle size corresponding to 0–10/25 mm/mesh is, if desired, mixed with concrete or unslaked lime. The concrete serves among others to obtain a faster hydraulic effect. Thereupon the desired quantity of water is added.

A metal container is disposed in a hollow cylinder which has an inside diameter greater than the outside diameter of the metal container. The cylindric space between the outside of the container and the hollow cylinder is filled with the aforementioned mixture, whereupon the whole is allowed to stand for a day. Thereupon the outer cylinder consisting of two sleeve halves is removed and the container is ready for use.

It has been found that when a steel slag aggregate is used the weighting sleeve can be manufactured without any concrete or in any event with less concrete as a hydraulic binder, than with a known covering for a tank, when in the same way a sleeve consisting of gravel particles of even size and concrete is formed, on this tank.

Besides, the weighting sleeve is at least 20% heavier than the same sleeve obtained from gravel particles and concrete.

When utilizing iron or particles as aggregate particles in the shape of a steel slag aggregate from a slag aggregate from metal melting furnaces a weight increase of about 15% of the weighting sleeve is obtained, while moreover the quantity of concrete, when iron or ore is used, is about 20% higher than in case the slag aggregate from metal melting furnaces is applied.

If desired a weighting sleeve with the same weight as when applying concrete and gravel aggregate can be obtained by admixing other substances but then considerably less concrete or even no concrete at all as binding agent should be utilized and with a much thinner sleeve layer.

Especially the latter circumstance is of great importance since it is not advisable to have the tanks surrounded by a thick sleeve layer.

II. Covering a metal pipe.

A mixture of 100 kg. of steel slag aggregate with a particle size corresponding to 0–10/25 mm/mesh and the required quantity of water is prepared. It is advisable to use a finely distributed aggregate since hereby the binding effect is improved.

The aforementioned mixture is applied to a metal pipe by a spray technique.

A pipe can be provided with a covering layer which is 20% thinner, as compared with a pipe covered with a mixture from concrete and/or lime and gravel particles.

What we claim is:

1. A method of weighting a pipe or container for storing fluids comprising:

(a) mixing a finely divided steel slag aggregate having hydraulic binding properties obtained from a steel slag furnace with water to obtain a sprayable mixture, said sprayable mixture consisting of steel slag aggregate and water, (b) applying said sprayable mixture onto the pipe or container by spraying said mixture onto said pipe or container in order to obtain a weighting coating layer on said pipe or container.

* * * * *